United States Patent
Wang et al.

(10) Patent No.: US 12,501,247 B2
(45) Date of Patent: Dec. 16, 2025

(54) SIGNAL TRANSMISSION METHOD AND APPARATUS, AND TERMINAL DEVICE

(71) Applicant: GUANGDONG OPPO MOBILE TELECOMMUNICATIONS CORP., LTD., Guangdong (CN)

(72) Inventors: Shukun Wang, Guangdong (CN); Yang Xu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 641 days.

(21) Appl. No.: 17/818,611

(22) Filed: Aug. 9, 2022

(65) Prior Publication Data
US 2022/0386210 A1    Dec. 1, 2022

Related U.S. Application Data

(63) Continuation of application No. PCT/CN2020/082796, filed on Apr. 1, 2020.

(51) Int. Cl.
*H04W 4/90* (2018.01)
*H04W 36/00* (2009.01)
(Continued)

(52) U.S. Cl.
CPC ......... *H04W 4/90* (2018.02); *H04W 36/0058* (2018.08); *H04W 36/322* (2023.05); *H04W 68/005* (2013.01)

(58) Field of Classification Search
CPC . H04W 4/90; H04W 36/0058; H04W 36/322; H04W 68/005; H04W 68/00; H04W 72/0446; H04W 88/06
See application file for complete search history.

(56) References Cited

U.S. PATENT DOCUMENTS

2016/0308636 A1    10/2016   Deng et al.
2019/0089473 A1     3/2019   Deng et al.
(Continued)

FOREIGN PATENT DOCUMENTS

CN    106130618 A    11/2016
CN    110290532 A     9/2019
(Continued)

OTHER PUBLICATIONS

Park et al., U.S. Appl. No. 62/840,717, filed Apr. 30, 2019 (Year: 2019).*

(Continued)

*Primary Examiner* — Peter Chen
*Assistant Examiner* — Jia Hao Deng
(74) *Attorney, Agent, or Firm* — PERKINS COIE LLP (57) ABSTRACT

Provided are a signal transmission method and apparatus, and a terminal device. The method includes that: a terminal device receives first configuration information from a first base station, the first configuration information being configured for determining a first time domain position, the first base station being a base station corresponding to a first communication card in the terminal device, and the first communication card being in a connected state; and the terminal device receives, at the first time domain position, a signal from a second base station, the second base station being a base station corresponding to a second communication card in the terminal device.

18 Claims, 3 Drawing Sheets

---

A terminal device receives first configuration information from a first base station, the first configuration information being configured for determining a first time domain position, the first base station being a base station corresponding to a first communication card in the terminal device, and the first communication card being in a connected state    — 201

The terminal device receives a signal from a second base station at the first time domain position, the second base station being a base station corresponding to a second communication card in the terminal device    — 202

(51) Int. Cl.
*H04W 36/32* (2009.01)
*H04W 68/00* (2009.01)

(56) References Cited

U.S. PATENT DOCUMENTS

| | | | |
|---|---|---|---|
| 2019/0110236 A1 | 4/2019 | Huang et al. | |
| 2019/0349884 A1 | 11/2019 | Ji et al. | |
| 2020/0077470 A1 | 3/2020 | Xiong et al. | |
| 2020/0267619 A1 | 8/2020 | Huang et al. | |
| 2020/0351818 A1* | 11/2020 | Park | H04W 52/0216 |
| 2021/0329507 A1* | 10/2021 | Yao | H04W 36/0085 |
| 2022/0053448 A1* | 2/2022 | Velev | H04W 76/38 |
| 2022/0240247 A1 | 7/2022 | Hong et al. | |

FOREIGN PATENT DOCUMENTS

| | | |
|---|---|---|
| CN | 110291801 A | 9/2019 |
| CN | 110622451 A | 12/2019 |
| WO | 2018137220 A1 | 8/2018 |

OTHER PUBLICATIONS

First Office Action of the Chinese application No. 202211573434.1, issued on Jun. 26, 2024. 23 pages with English translation.
Huawei, HiSilicon, "Introduction of MUSIM UE Capabilities", 3GPP TSG-RAN WG2 Meeting #117-e R2-2203801, Electronic meeting, Feb. 21-Mar. 3, 2022. 5 pages.
Vivo (Rapporteur), Introduction of NR RRC support for Musim, 3GPP TSG-RAN WG2 Meeting #117-e R2-2204207, Online, Feb. 21-Mar. 3, 2022. 92 pages.
3GPP "Technical Specification Group Core Network and Terminals; Non-Access-Stratum (NAS) protocol for 5G System (5GS); Stage 3; (Release 17)" Technical Specification, (Jun. 2022); 3GPP TS 24.501 V17.7.1. 964 pages.
3GPP "Requirements for support of radio resource management (Release 17)", Technical Specification (Jun. 2022); 3GPP TS 38.133 V17.6.0. 3287 pages.
3GPP "NR; NR and NG-RAN Overall Description; Stage 2 (Release 17)" Technical Specification, (Jun. 2022); 3GPP TS 38.300 V17.1.0. 209 pages.
3GPP "Radio Resource Control (RRC) protocol specification(Release 17)" Technical Specification, (Jun. 2022); 3GPP TS 38.331 V17.1.0. 1271 pages.
Sony: "Solution for KI#3: Receiving Paging Occasions in other Networks" SA WG2 Meeting #136 S2-1911145, Nov. 18-22, 2019, Reno, US. 4 pages.
Intel Corporation: "Motivation for RAN Level Multi-Sim Support" 3GPP TSG RAN #84 RP-191347, Newport Beach, USA, Jun. 3-6, 2019. 7 pages.
Qualcomm Incorporated: "Solution for scheduling gap" SA WG2 Meeting #136 S2-1911732, Nov. 18-22, 2019, Reno, USA. 2 pages.
Supplementary European Search Report in the European application No. 20928377.9, mailed on Dec. 16, 2022. 10 pages.
International Search Report in the international application No. PCT/CN2020/082796, mailed on Dec. 31, 2020. (5 pages).
Written Opinion of the International Search Authority in the international application No. PCT/CN2020/082796, mailed on Dec. 31, 2020. (6 pages).

* cited by examiner

SIGNAL TRANSMISSION METHOD AND APPARATUS, AND TERMINAL DEVICE

This is a continuation application of International Patent Application No. PCT/CN2020/082796 filed on Apr. 1, 2020, the disclosure of which is incorporated herein by reference in its entirety.

TECHNICAL FIELD

Technical Field

Embodiments of the present disclosure relate to the technical field of mobile communication, and more particularly to a signal transmission method and apparatus, and a terminal device.

Background

A dual-card dual-standby mobile phone means that a mobile phone can hold two communication cards at the same time, and both the two communication cards are in a standby state. Such a mobile phone generally does not support pure dual-sending and dual-receiving (referred to as dual-active). Dual-sending and dual-receiving means that the mobile phone performs uplink sending and downlink receiving of data over two networks simultaneously through two communication cards. However, dual-active is a trend of the development of mobile phones in the future, but the implementation of dual-active in one mobile phone will cause resource sharing and allocation between two communication cards.

SUMMARY

The embodiments of the present disclosure provide a signal transmission method and apparatus, and a terminal device.

The signal transmission method provided by the embodiments of the present disclosure may include the following operations.

A terminal device receives first configuration information from a first base station, the first configuration information being configured for determining a first time domain position. The first base station is a base station corresponding to a first communication card in the terminal device, and the first communication card is in a connected state.

The terminal device receives a signal from a second base station at the first time domain position. The second base station is a base station corresponding to a second communication card in the terminal device.

The signal transmission apparatus provided by the embodiments of the present disclosure is implemented by a terminal device, and may include a receiving unit.

The receiving unit is configured to: receive first configuration information from a first base station, the first configuration information being configured for determining a first time domain position; and receive a signal from a second base station at the first time domain position. The first base station is a base station corresponding to a first communication card in the terminal device, and the first communication card is in a connected state. The second base station is a base station corresponding to a second communication card in the terminal device.

The terminal device provided by the embodiments of the present disclosure may include a processor and a memory. The memory is configured to store a computer program, and the processor may be configured to call and run the computer program stored in the memory to implement the signal transmission method.

A chip provided in the embodiments of the present disclosure is configured to implement the signal transmission method.

Specifically, the chip may include a processor, configured to call and run a computer program in a memory to enable a device installed with the chip to implement the signal transmission method.

A computer-readable storage medium provided in the embodiments of the present disclosure is configured to store a computer program which enables a computer to execute the signal transmission method.

A computer program product provided in the embodiments of the present disclosure may include a computer program instruction which enables a computer to execute the signal transmission method.

A computer program provided in the embodiments of the present disclosure, When run in a computer, may enable the computer to execute the signal transmission method.

BRIEF DESCRIPTION OF THE DRAWINGS

The accompanying drawings described here are used for providing further understanding of the present disclosure, and constitute a part of the present disclosure. Schematic embodiments of the present disclosure and description thereof are used for illustrating the present disclosure and not intended to form an improper limit to the present disclosure. In the accompanying drawings.

DETAILED DESCRIPTION

The technical solutions in the embodiments of the present disclosure will be described below in combination with the drawings in the embodiments of the present disclosure. It is apparent that the described embodiments are not all embodiments but part of embodiments of the present disclosure. All other embodiments obtained by those of ordinary skill in the art based on the embodiments in the present disclosure without creative work shall fall within the scope of protection of the present disclosure.

The technical solutions of the embodiments of the present disclosure may be implemented by various communication systems, for example, a long term evolution (LTE) system, an LTE frequency division duplex (FDD) system, an LTE time division duplex (TDD) system, a 5th generation (5G) communication system or a future communication system.

Figure 1:
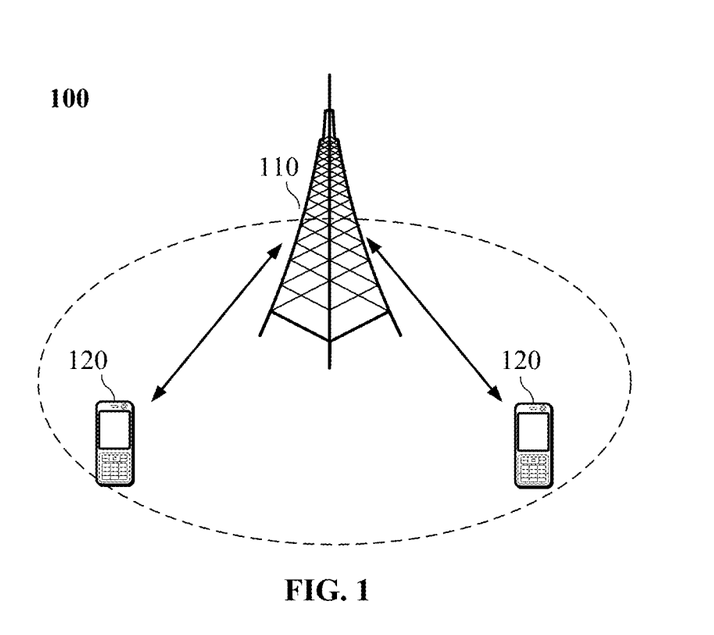
FIG. 1 is a schematic diagram of a communication system architecture provided by an embodiment of the present disclosure.

Exemplarily, a communication system 100 that is applicable to the embodiments of the present disclosure is shown in FIG. 1. The communication system 100 may include a network device 110, and the network device 110 may be a device communicating with a terminal 120 (or called a communication terminal or a terminal). The network device 110 may provide communication coverage for a specific geographical region and may communicate with a terminal located in the coverage. In some embodiments, the network device 110 may be an evolutional node B (eNB or eNodeB) in an LTE system, or a wireless controller in a cloud radio access network (CRAN). Or the network device may be a mobile switching center, a relay station, an access point, a vehicle device, a wearable device, a hub, a switch, a network bridge, a router, a network-side device in a 5G network or a network device in a future communication system.

The communication system 100 may further include at least one terminal 120 within the coverage of the network device 110. The "terminal" used herein includes, but not limited to, a device configured to receive/send a communication signal through a wired line connection, for example, through public switched telephone network (PSTN), digital subscriber line (DSL), digital cable and direct cable connections, and/or another data connection/network) and/or through a wireless interface, for example, for a cellular network, a wireless local area network (WLAN), a digital television network like a digital video broadcasting-handheld (DVB-H) network, a satellite network and an amplitude modulated (am)-frequency modulated (FM) broadcast transmitter, and/or another terminal, and/or an internet of things (IoT) device. The terminal configured to communicate through a wireless interface may be called a "wireless communication terminal", a "wireless terminal" or a "mobile terminal." Examples of the mobile terminal include, but not limited to, a satellite or cellular telephone, a personal communication system (PCS) terminal capable of combining a cellular radio telephone and data processing, faxing and data communication capabilities, a personal digital assistant (PDA) capable of including a radio telephone, a pager, Internet/intranet access, a Web browser, a notepad, a calendar and/or a global positioning system (GPS) receiver, and a conventional laptop and/or palmtop receiver or another electronic device including a radio telephone transceiver. The terminal may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a session initiation protocol (SIP) phone, a wireless local loop (WLL) station, a PDA, a handheld device with a wireless communication function, a computing device, another processing device connected to a wireless modem, a vehicle device, a wearable device, a terminal in the 5G network, a terminal in the future evolved PLMN or the like.

In some embodiments, device to device (D2D) communication may be performed between the terminals 120.

In some embodiments, the 5G communication system or the 5G network may also be called an NR system or an NR network.

A network device and two terminals are exemplarily shown in FIG. 1. In some embodiments, the communication system 100 may include multiple network devices, and another number of terminals may be included in coverage of each network device. There are no limits made thereto in the embodiments of the present disclosure.

In some embodiments, the communication system 100 may further include another network entity such as a network controller and a mobility management entity (MME). No limits are made thereto in the embodiments of the present disclosure.

It is to be understood that a device with a communication function in the network/system in the embodiments of the present disclosure may be called a communication device. For example, for the communication system 100 shown in FIG. 1, communication devices may include the network device 110 and terminal 120 with the communication function, and the network device 110 and the terminal 120 may be the specific devices mentioned above and will not be elaborated herein. The communication devices may further include other devices in the communication system 100, for example, other network entities like a network controller and an MME. There are no limits made thereto in the embodiments of the present disclosure.

It is to be understood that terms "system" and "network" in the present disclosure may usually be exchanged in the present disclosure. In the present disclosure, term "and/or" represents only an association relationship describing associated objects and means that three relationships may exist. For example, A and/or B may represent three conditions: i.e., independent existence of A, existence of both A and B and independent existence of B. In addition, character "I" in the present disclosure usually represents that previous and next associated objects form an "or" relationship.

For the convenience of understanding the technical solutions in the embodiments of the present disclosure, the relevant technological solutions of the embodiments of the present disclosure are described below.

With the people's pursuit of speed, delay, high-speed mobility and energy efficiency as well as the diversity and complexity of services in future life, the 3rd generation partnership project (3GPP) International Standards Organization has started development of 5G. The main application scenarios of 5G are as follows: enhanced mobile broadband (eMBB), ultra-reliable low-latency communications (URLLC), and massive machine-type communications (mMTC).

On one hand, eMBB still aims to enable a user to obtain multimedia content, service and data, and requirements thereof increase rapidly. On the other hand, eMBB may be deployed in different scenarios, for example, a room, an urban area and a rural area, and capabilities and requirements thereof are also greatly different, therefore, eMBB scenarios cannot be generalized and are required to be analyzed in combination with specific deployment scenarios. Typical applications of URLLC include industrial automation, power automation, remote medical operation, traffic safety guarantee and the like. Typical features of mMTC may include: high connection density, small data volume, delay-insensitive services, low cost and long service life of modules and the like.

Radio Resource Control (RRC) State

In 5G, a new RRC state, namely an RRC_INACTIVE state, is defined for reducing air interface signaling and quickly resuming wireless connection and data service. This state is different from an RRC_IDLE state or an RRC_ACTIVE state.

1) RRC_IDLE state (called an idle state for short): mobility is UE-based re-selection of cell selection, paging is initiated by a Core Network (CN), and a paging area is configured by the CN. There is no UE context and no RRC connection on a base station side.

2) RRC_CONNECTED state (called a connected state for short): there is a RRC connection, and there is UE context at a base station side and a UE side. The network side knows that the location of the UE is a specific cell level. The mobility is controlled by the network side. Unicast data may be transmitted between the UE and the base station.

3) RRC_INACTIVE state (called an inactive state for short): the mobility is UE-based re-selection of cell selection, there is a connection between CN and NR, there is UE context on a certain base station, paging is triggered by RAN, an RAN-based paging area is managed by the RAN, and the network side knows that the location of the UE is an RAN-based paging area level.

Dual-Card Dual-Standby/Dual-Network Dual Standy

A dual-card dual-standby mobile phone means that a mobile phone can hold two communication cards at the same time, and both the two communication cards are in a standby state. Dual-card dual-standby generally is directed to a same network system, for example, dual-card dual-standby of a GSM network, dual-card dual-standby of a CDMA network and dual-card dual-standby of a PHS network.

Dual-network dual-standby means that a mobile phone may be equipped with two communication cards of different networks, and may put the two cards in an enabled stated at the same time, so that users can make and receive calls as well as send and receive text messages without switching between networks.

At present, mobile phones generally do not support pure dual-sending and dual-receiving (referred to as dual-active), which means that the mobile phones perform uplink sending and downlink receiving of data over two networks simultaneously through two communication cards. Generally speaking, most mobile phones only support single-sending and single-receiving or single-sending and dual-receiving, which means that the mobile phones can perform services on only one communication card at a time. However, the realization of dual-active is a trend of the development of mobile phones in the future. In 5G, for two communication cards in the mobile phone supporting dual-card dual-standby or dual-network dual-standby, one can reside in an LTE cell, and the other can reside in an NR cell; or, both the two communication cards reside in the NR cell. On the other hand, two communication cards can be either the communication cards of the same service provider, or the communication cards of different service providers.

When double-active is realized in a mobile phone, there is a problem related to resource sharing and allocation between two communication cards. Accordingly, the following technical solutions of the embodiments of the present disclosure are proposed.

It is to be noted that a "terminal device" in the embodiments of the present disclosure may be a mobile phone, a tablet personal computer, a wearable device, etc., and the terminal device has at least two communication cards, for example, the terminal device has two communication cards or three communication cards. The following embodiments are described taking that the terminal device has two communication cards as an example. Not limited to this, the case of more than two communication cards is also applicable to the technical solutions of the embodiments of the present disclosure.

It is to be noted that the types of the first communication card and the second communication card are not limited in the embodiments of the present disclosure. For example, both the first communication card and the second communication card are subscriber identity module (SIM) cards. For example, both the first communication card and the second communication card are universal subscriber identity module (USIM) cards. For example, the first communication card is an SIM card, and the second communication card is a Universal Subscriber Identity Module (USIM) card. For example, the first communication card is a USIM card, and the second communication card is an SIM card.

On the other hand, the network types supported by the first communication card and the second communication card are not limited in the embodiments of the present disclosure. For example, the first communication card may support an LTE network (that is, the first base station corresponding to the first communication card is an LTE base station), and the second communication card may support an NR network (that is, the second base station corresponding to the second communication card is an NR base station). For example, both the first communication card and the second communication card may support an NR network (that is, both the first base station corresponding to the first communication card and the second base station corresponding to the second communication card are the NR base station).

Still on another hand, the service providers to which the first communication card and the second communication card belong are not limited in the embodiments of the present disclosure. For example, the first communication card and the second communication card may belong to the same service provider or different service providers.

Figure 2:
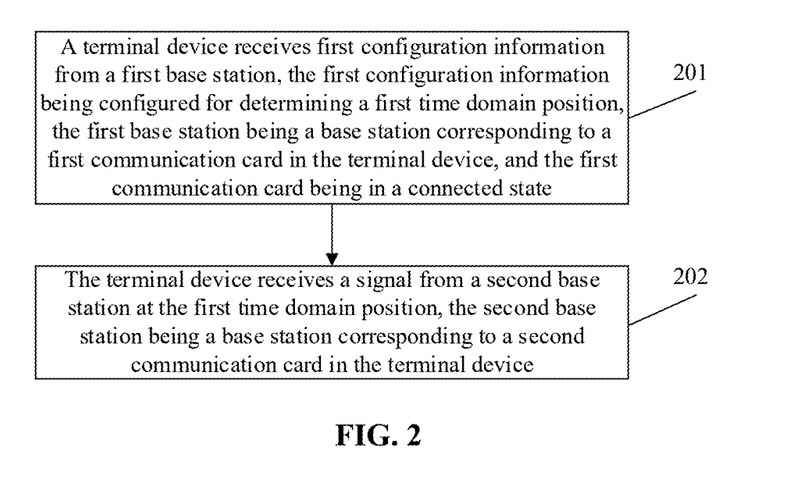
FIG. 2 is a flowchart of a signal transmission method provided by an embodiment of the present disclosure.

FIG. 2 is a flowchart of a signal transmission method provided by an embodiment of the present disclosure. As shown in FIG. 2, the signal transmission method may include the following operations.

At operation 201, a terminal device receives first configuration information from a first base station, the first configuration information being configured for determining a first time domain position, the first base station being a base station corresponding to a first communication card in the terminal device, and the first communication card being in a connected state.

Figure 3:
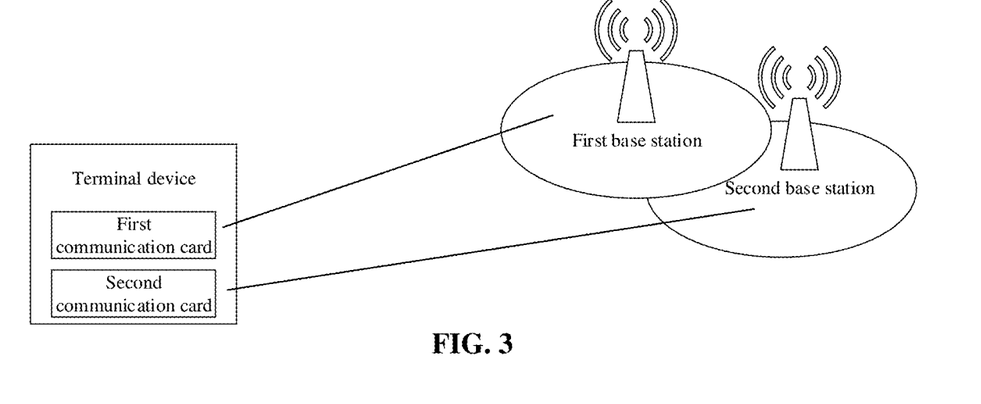
FIG. 3 is a schematic diagram of a dual-card scenario provided by an embodiment of the present disclosure.

In the embodiments of the present disclosure, referring to FIG. 3, the terminal device has a first communication card and a second communication card. The base station corresponding to the first communication card is the first base station, and the base station corresponding to the second communication card is the second base station. On one hand, the terminal device may access the first base station through the first communication card to realize uplink sending and/or downlink receiving of data over a first network. On the other hand, the terminal device may access the second base station through the second communication card to realize uplink sending and/or downlink receiving of data over a second network. Here, the types of the first network and the second network may be the same or different. For example, the first network is an LTE network, and the second network is an NR network. For another example, both the first network and the second network are an NR network.

It is to be noted that, in an implementation mode, the base station corresponding to the first communication card and the base station corresponding to the second communication card are different base stations. In another implementation mode, the base station corresponding to the first communication card and the base station corresponding to the second communication card are the same base station. In this case, the description of "the second base station" in the embodiments of the present disclosure can be equivalently replaced with the description of "the first base station", or the description of "the first base station" can be equivalently replaced with the description of "the second base station".

In the embodiments of the present disclosure, there are ongoing services in the first communication card, and the first communication card is in the connected state. The second communication card of the terminal device may be in the idle state or the inactive state or the connected state. For example, there are two USIM cards in the terminal device, which are respectively USIM-A card and USIM-B card. There are ongoing services in the USIM-A card, and the USIM-A card is in the connected state. The USIM-B card is in the idle state or the inactive state or the connected state.

It is to be noted that the communication between the terminal device and the first base station is implemented through the first communication card, and the communication between the terminal device and the second base station is implemented through the second communication card. For example, there are two USIM cards in the terminal device, which are respectively the USIM-A card and the USIM-B card. The terminal device can communicate with the first base station through the USIM-A card, and the terminal device can communicate with the second base station through the USIM-B card.

In the embodiments of the present disclosure, the terminal device receives the first configuration information from the first base station, the first configuration information being configured for determining a first time domain position. Here, the first time domain position is a time domain position for receiving a signal from the second base station.

At operation 202, the terminal device receives a signal from a second base station at the first time domain position, the second base station being a base station corresponding to a second communication card in the terminal device.

In the embodiments of the present disclosure, the first configuration information may be implemented in several following modes. How to determine the first time domain position is described below in combination with the different implementation modes for the first configuration information.

Mode 1

The first configuration information includes an autonomous gap configuration, and the first time domain position is a time domain position corresponding to an autonomous gap. The terminal device receives, at the time domain position corresponding to the autonomous gap, from the second base station at least one of followings: a paging message, updated system broadcast information, and Public Warning System (PWS) information.

In an implementation mode, before receiving the first configuration information from the first base station, the terminal device may send a first request message to the first base station, the first request message being configured for requesting the first base station to configure the autonomous gap.

Further, in some embodiments, the first request message may carry first indication information, the first indication information being configured for indicating that the terminal device requests for the autonomous gap to receive from the second base station at least one of followings: the paging message, the updated system broadcast information, and the PWS information.

Further, in some embodiments, the autonomous gap configuration may carry second indication information, the second indication information being configured for indicating use of the autonomous gap. The use of the autonomous gap may include at least one of followings:

the autonomous gap is used for the terminal device to read neighbor system broadcast information;

the autonomous gap is used for the terminal device to receive the paging message from the second base station;

the autonomous gap is used for the terminal device to receive the system broadcast information from the second base station; and the autonomous gap is used for the terminal device to receive the PWS information from the second base station.

For example, the first base station corresponding to the USIM-A card configures the autonomous gap for the terminal device, and the terminal devices uses the autonomous gap configured by the first base station to search the second base station corresponding to the USIM-B card for at least one of followings: the paging message, the updated system broadcast information and the PWS information.

In some embodiments, if the first base station corresponding to the USIM-A card does not configure the autonomous gap for the terminal device, the terminal device may request the first base station to configure the autonomous gap. In some embodiments, the terminal device may also indicate the first base station that the purpose of the terminal device requesting for the autonomous gap is to receive, in a scenario of multiple communication cards (e.g. dual communication cards), from the second base station at least one of followings: the paging message, the updated system broadcast information, and the PWS information.

In some embodiments, the first base station corresponding to the USIM-A card may indicate the purpose of the terminal device requesting for the autonomous gap while configuring the autonomous gap.

It is to be noted that, the autonomous gap means that the terminal device can leave autonomously the current serving network for a period of time without notifying the network side. For the autonomous gap configured by the first base station, the terminal device can leave autonomously a network service provided by the first base station for a period of time without notifying the first base station. The first base station does not know at what time the terminal device leaves the network service provided by the first base station, and only knows that the terminal device can leave the network service provided by the first base station for a period of time.

Mode 2

A) The first configuration information includes a gap pattern configuration, the gap pattern configuration being configured for determining a time domain position of the gap. The first time domain position refers to the time domain position of the gap. The terminal device receives, at the time domain position of gap, from the second base station at least one of followings: a paging message, updated system broadcast information, and PWS information. Or, B) the first configuration information includes a time-division multiplexing (TDM) pattern configuration, the TDM pattern configuration being configured for determining a time domain position where the first base station does not work. The first time domain position refers to the time domain position where the first base station does not work. The terminal device receives, at the time domain position where the first base station does not work, from the second base station at least one of followings: paging message, updated system broadcast information, and PWS information.

In an implementation mode, before receiving the first configuration information from the first base station, the terminal device may send a second request message to the first base station, the second request message being configured for requesting the first base station to configure a gap pattern or a TDM pattern.

Further, in some embodiments, the second request message may carry position information of a Paging Occasion (PO), and the position information of the PO may be determined based on the system broadcast information of the second base station.

For example, the terminal device may receive the system broadcast information of the second base station corresponding to the USIM-B card, calculate a PO position based on the system broadcast information, request the first base station corresponding to the USIM-A card based on the PO position to configure a gap pattern or a TDM pattern. After obtaining the gap pattern configuration or the TDM pattern configuration configured by the first base station, the terminal device may receive, within a duration of gap determined by the gap pattern configuration or within a time slot or symbol where the first base station does not work determined by the TDM pattern configuration, from the second base station at least one of followings: the paging message, the updated system broadcast information, and the PWS information.

It is to be noted that, the operation that the terminal device receives the paging message and/or the updated system broadcast information and/or the PWS information from the second base station means that the terminal device receives the paging message and/or the updated system broadcast information and/or the PWS information of a cell where the second communication card (e.g. the USIM-B card) is. The cell for the second communication card (e.g. the USIM-B card) is the cell covered by the second base station.

Mode 3

A) The first configuration information includes a gap pattern configuration, the gap pattern configuration being configured for determining a time domain position of a gap. The first time domain position refers to the time domain position of the gap. The terminal device performs cell selection measurement and/or cell re-selection measurement corresponding to the second communication card at the time domain position of the gap.

B) The first configuration information includes a TDM pattern configuration, the TDM pattern configuration being configured for determining a time domain position where the first base station does not work. The first time domain position refers to the time domain position where the first base station does not work. The terminal device performs, at the time domain position where the first base station does not work, cell selection measurement and/or cell re-selection measurement corresponding to the second communication card.

In an implementation mode, before receiving the first configuration information from the first base station, the terminal device may obtain frequency information of the cell selection measurement and/or the cell re-selection measurement based on system broadcast information of the second base station; the terminal device may generate the gap pattern configuration or the TDM pattern configuration to be requested based on the frequency information of the cell selection measurement and/or the cell re-selection measurement; and the terminal device may send a third request message to the first base station, the third request message carrying the gap pattern configuration or the TDM pattern configuration to be requested and being configured for requesting the first base station to configure a gap pattern or a TDM pattern.

Further, in some embodiments, the frequency information may include at least one of followings corresponding to each of at least one frequency point: SSB-based measurement timing configuration (SMTC) configuration information and SMTC timing information.

For example, the terminal device may obtain the frequency information of the cell selection measurement and/or the cell re-selection measurement based on the system broadcast information of the cell where the USIM-B card is. The frequency information includes E-UTRAN frequency point information, NR frequency point information, an SMTC measurement configuration (such as SMTC configuration information and SMTC timing information) corresponding to the NR frequency point, and so on. The terminal device may generate a gap pattern configuration or a TDM pattern configuration to be requested based on the above frequency information, and then request the first base station corresponding to the USIM-A card to configure a gap pattern or a TDM pattern. After obtaining the gap pattern configuration or the TDM pattern configuration configured by the first base station, the terminal device may perform the cell selection measurement and/or the cell re-selection measurement required by the cell where the USIM-B card is within the duration of gap determined by the gap pattern configuration or within a time slot or symbol where the first base station does not work determined by the TDM pattern configuration.

In the embodiments of the present disclosure, after receiving the paging message from the second base station, the terminal device may reject or accept service reception at the second base station. The following situations are described.

Situation 1: The Terminal Device Rejects Service Reception at the Second Base Station.

After receiving the paging message from the second base station, the terminal device may determine, based on service information that triggers the paging message, to reject the service reception at the second base station; and the terminal device may send third indication information to the second base station, the third indication information being configured for indicating rejection of the service reception or indicating temporary rejection of the service reception.

Here, the terminal device may obtain the service information that triggers the paging message based on a paging cause in the paging message; or, after the second communication card enters the connected state, the terminal device may obtain the service information that triggers the paging message from the core network corresponding to the second base station. For example, after receiving the paging message from the second base station corresponding to the USIM-B card, the terminal device may obtain the service information that triggers the paging based on the paging cause in the paging message; or after the USIM-B card enters the connected state, the terminal device may obtain the service information that triggers the paging from the core network.

It is to be noted that the service information that triggers the paging message is the service information at the second base station. When the priority of the service information at the second base station is lower than a specified priority, or the priority of the service information at the second base station is lower than the priority of the service information at the first base station, the terminal device may determine to reject the service reception at the second base station.

I) In an implementation mode, the terminal device may send the third indication information to the core network corresponding to the second base station. When the third indication information indicates the temporary rejection of service reception, the third indication information further instructs the core network corresponding to the second base station to cache service data locally, and to release the locally cached service data when a duration of caching the service data exceeds a specified duration.

Here, the third indication information may carry a first timer configuration, the first timer configuration being configured for determining that a duration of a first timer is the specified duration. The core network corresponding to the second base station may start the first timer after receiving the third indication information that carries the first timer configuration, and releases the locally cached service data when the first timer times out.

II) In another implementation mode, the terminal device may send the third indication information to the second base station. When the third indication information indicates the temporary rejection of service reception, the third indication information further instructs the second base station to cache service data locally, and to release the locally cached service data and/or release the second communication card to an inactive state when a duration of caching the service data exceeds a specified duration.

Here, the third indication information may carry a second timer configuration, the second timer configuration being configured for determining that a duration of a second timer is the specified duration. The second base station may start the second timer after receiving the third indication information that carries the second timer configuration, and releases the locally cached service data (that is, deletes the locally cached service data) when the second timer times out.

Situation 2: The Terminal Device Accepts the Service Reception at the Second Base Station.

After receiving the paging message from the second base station, the terminal device may determine, based on the service information that triggers the paging message, to accept service reception at the second base station; and the terminal device may send fourth indication information to the first base station, the fourth indication information being configured for indicating rejection of the service reception or indicating temporary rejection of the service reception.

Here, the terminal device may obtain the service information that triggers the paging message from the paging cause in the paging message; or, after the second communication card enters the connected state, the terminal device may obtain the service information that triggers the paging message from the core network corresponding to the second base station. For example, after receiving the paging message from the second base station corresponding to the USIM-B card, the terminal device may obtain the service information that triggers the paging based on the paging cause in the paging message; or after the USIM-B card enters the connected state, the terminal device may obtain the service information that triggers the paging from the core network.

It is to be noted that the service information that triggers the paging message is the service information on the second base station side. When the priority of the service information on the second base station side is higher than a specified priority, or the priority of the service information on the second base station side is higher than or equal to the priority of the service information on the first base station side, the terminal device determines to accept service reception on the second base station side.

I) In an implementation mode, the terminal device may send the fourth indication information to a core network corresponding to the first base station. When the fourth indication information indicates the temporary rejection of service reception, the fourth indication information further instructs the core network corresponding to the first base station to cache service data locally, and to release the locally cached service data when a duration of caching the service data exceeds a specified duration.

Here, the fourth indication information may carry a third timer configuration, the third timer configuration being configured for determining that a duration of a third timer is the specified duration. The core network corresponding to the first base station may start the third timer after receiving the fourth indication information that carries the third timer configuration, and release the locally cached service data (that is, deletes the locally cached service data) when the third timer times out.

II) In another implementation mode, the terminal device may send the fourth indication information to the first base station. When the fourth indication information indicates the temporary rejection of service reception, the fourth indication information further instructs the first base station to cache service data locally, and to release the locally cached service data and/or release the first communication card to the inactive state when a duration of caching the service data exceeds a specified duration.

Here, the fourth indication information may carry a fourth timer configuration, the fourth timer configuration being configured for determining that a duration of a fourth timer is the specified duration. The first base station may start the fourth timer after receiving the fourth indication information that carries the fourth timer configuration, and release the locally cached service data (that is, deletes the locally cached service data) when the fourth timer times out.

Situation 3: The Terminal Device Accepts Service Reception at the Second Base Station.

After receiving the paging message from the second base station, the terminal device may determine to accept service reception at the second base station based on service information that triggers the paging message; and the terminal device may receive service data from the first base station and service data from the second base station.

Here, the terminal device may obtain the service information that triggers the paging message based on the paging cause in the paging message; or, after the second communication card enters the connected state, the terminal device may obtain the service information that triggers the paging message from the core network corresponding to the second base station. For example, after receiving the paging message from the second base station corresponding to the USIM-B card, the terminal device may obtain the service information that triggers the paging based on the paging cause in the paging message; or after the USIM-B card enters the connected state, the terminal device may obtain the service information that triggers the paging from the core network.

It is to be noted that the service information that triggers the paging message is the service information on the second base station side. When the priority of the service information on the second base station side is higher than the specified priority, or the priority of the service information on the second base station side is higher than or equal to the priority of the service information on the first base station side, the terminal device determines to accept service reception at the second base station.

Further, the terminal device may negotiate again with the first base station and/or the second base station about a gap pattern configuration or a TDM pattern configuration. For example, the terminal device may renegotiate about the gap pattern configuration or the TDM pattern configuration based on at least one of following information of service data on the first base station side and the second base station side: the type of the service data, the service volume of the service data, and the Quality of Service (QoS) of the service data.

How the terminal device renegotiates with the first base station and/or the second base station about the gap pattern configuration or the TDM pattern configuration is described below.

Negotiation Mode 1

The terminal device sends a fourth request message to the first base station, the fourth request message carrying a gap pattern configuration or a TDM pattern configuration requested by the terminal device; the terminal device receives a target gap pattern configuration or a target TDM pattern configuration from the first base station, the target gap pattern configuration being the gap pattern configuration requested by the terminal device or a gap pattern configuration modified by the first base station, and the target TDM pattern configuration being the TDM pattern configuration requested by the terminal device or a TDM pattern configuration modified by the first base station; and the terminal device sends the target gap pattern configuration or the target TDM pattern configuration to the second base station.

For example, the terminal device may trigger a process of initiating a gap pattern configuration request or a TDM pattern configuration request to the first base station corresponding to the USIM-A card. The first base station may reject the gap pattern configuration or the TDM pattern configuration requested by the terminal device; or, the first base station may modify the gap pattern configuration or the TDM pattern configuration requested by the terminal device and feed the modified configuration back to the terminal device for acknowledgment, and then the terminal device may send the modified gap pattern configuration or TDM pattern configuration to the second base station corresponding to the USIM-B card; or, the first base station may accept the gap pattern configuration or the TDM pattern configuration requested by the terminal device and instruct the terminal device to accept the gap pattern configuration or the TDM pattern configuration requested by the terminal device, and then the terminal device may send the requested gap pattern configuration or TDM pattern configuration to the second base station corresponding to the USIM-B card.

Negotiation Mode 2

The terminal device determines the gap pattern configuration or the TDM pattern configuration based on at least one of followings: a service type at the first base station, a service volume at the first base station, QoS at the first base station, a service type at the second base station, a service volume at the second base station, QoS at the second base station, and a timing deviation between the first base station and the second base station; and the terminal device sends the determined gap pattern configuration or TDM pattern configuration to the first base station and/or the second base station.

In the above solution, the negotiation about the gap pattern configuration or the TDM pattern configuration may be triggered by the terminal device; or, the negotiation about the gap pattern configuration or the TDM pattern configuration may be triggered by the first base station; or, the negotiation about the gap pattern configuration or the TDM pattern configuration may be triggered by the second base station.

In an example, cell re-selection or cell handover may trigger a renegotiation of the gap pattern configuration or the TDM pattern configuration. For example, when cell re-selection or cell handover occurs to the first communication card, the terminal device may obtain the system broadcast information of the second base station again, thus the negotiation about the gap pattern configuration or the TDM pattern configuration is triggered by the terminal device. Specifically, the terminal device may initiate again a process of requesting for or negotiating about the gap pattern configuration or the TDM pattern configuration to the first base station. For example, when cell handover occurs to the first communication card, the negotiation about the gap pattern configuration or the TDM pattern configuration is triggered by the first base station (or the target base station of the first communication card) or the terminal device.

In the above solution of the embodiments of the present disclosure, the gap pattern configuration may include at least one of followings: a duration of the gap, a period of the gap, and a bias of the gap. Further, the reference timing of the gap pattern configuration is the reference timing of the current cell of the first communication card.

In an example, the time domain position of the gap may be determined based on a following formula. A System Frame Number (SFN) and a subframe that are determined by the following formula are the starting point of the gap:

SFN mod T=(FLOOR (Offset/10));
if the Periodicity is larger than sf5:
subframe=Offset mod 10;
else:
subframe=Offset or (Offset+5);
with T=CEIL(Periodicity/10).

In the above solution of the embodiments of the present disclosure, the TDM pattern configuration includes at least one of followings: a TDM pattern, a period of the TDM pattern, and a bias of the TDM pattern. The reference timing of the TDM pattern configuration is the reference timing of the current cell of the first communication card.

In an example, the TDM pattern takes the subframe as unit. The SFN and the subframe both satisfying the following formula are the starting point of the TDM pattern:

SFN mod T=(FLOOR (Offset/10));
if the Periodicity is larger than sf5:
subframe=Offset mod 10;
else:
subframe=Offset or (Offset+5);
with T=CEIL(Periodicity/10).

The TDM pattern is a bitmap of n bits, for example, n=40. Each bit in the bitmap corresponds to a subframe, and the bit is set to 1 or 0 to indicate whether the sub-frame can transmit or receive/send data.

In another example, the TDM pattern takes the SFN as unit. The SFN satisfying the following formula is the starting point of the TDM pattern:

SFN mod T=Offset.

In an implementation mode of the present disclosure, when the terminal device determines that the gap pattern configuration or the TDM pattern configuration is not required, the terminal device may send a fifth request message to the first base station and/or the second base station, the fifth request message being configured for requesting release of the gap pattern configuration or the TDM pattern configuration; and after receiving a release acknowledgment message, the terminal device may release the gap pattern configuration or the TDM pattern configuration.

Based on the technical solutions of the embodiments of the present disclosure, the terminal device has a first communication card and a second communication card, the base station corresponding to the first communication card being the first base station, and the base station corresponding to the second communication card being the second base station, the terminal device receives the first configuration information from the first base station, determines a time domain position based on the first configuration information, and receives a signal from the second base station at the time domain position. By means of such resource negotiation, resource sharing of two communication cards can be realized, and thus the double-active function of the terminal device is realized.

Figure 4:
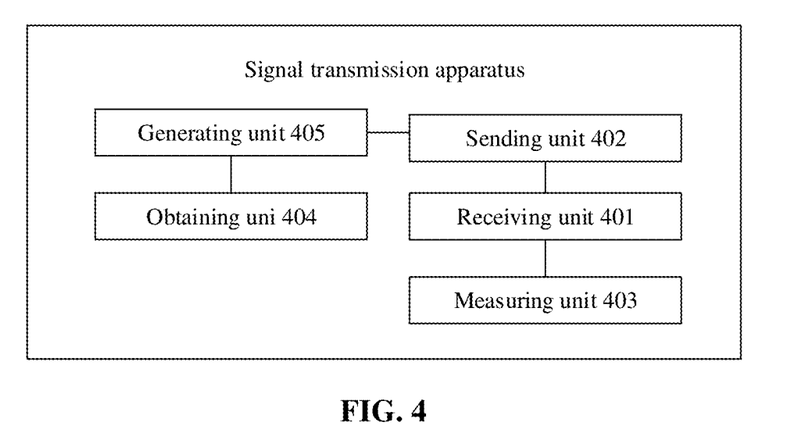
FIG. 4 is a structural schematic diagram of a signal transmission apparatus provided by an embodiment of the present disclosure.

FIG. 4 is a structural schematic diagram of a signal transmission apparatus provided by an embodiment of the present disclosure, which is implemented by a terminal device. As shown in FIG. 4, the signal transmission apparatus may include: a receiving unit 401.

The receiving unit 401 is configured to: receive first configuration information from the first base station, the first configuration information being configured for determining a first time domain position; and receive, at the first time domain position, a signal from the second base station. The first base station is a base station corresponding to the first communication card in the terminal device, and the first communication card is in a connected state. The second base station is a base station corresponding to the second communication card in the terminal device.

In an implementation mode, the first configuration information may include an autonomous gap configuration. The autonomous gap configuration is a time domain position corresponding to the autonomous gap.

The receiving unit 401 is configured to receive, at the time domain position corresponding to the autonomous gap, from the second base station at least one of followings: a paging message, updated system broadcast information, and PWS information.

In an implementation mode, the apparatus may also include a sending unit 402.

The sending unit 402 is configured to send a first request message to the first base station, the first request message being configured for requesting the first base station to configure the autonomous gap.

In an implementation mode, the first request message may carry first indication information, the first indication information being configured for indicating that the terminal device requests for the autonomous gap to receive from the second base station at least one of followings: the paging message, the updated system broadcast information, and the PWS information.

In an implementation mode, the autonomous gap configuration may carry second indication information, the second indication information being configured for indicating use of the autonomous gap.

In an implementation mode, the use of the autonomous gap may include at least one of followings:

the autonomous gap is used for the terminal device to read the neighbor system broadcast information;

the autonomous gap is used for the terminal device to receive the paging message from the second base station;

the autonomous gap is used for the terminal device to receive the system broadcast information from the second base station; and the autonomous gap is used for the terminal device to receive the PWS information from the second base station.

In an implementation mode, the first configuration information may include a gap pattern configuration, the gap pattern configuration being configured for determining a time domain position of a gap. The first time domain position refers to the time domain position of the gap.

The receiving unit 401 is configured to receive, at the time domain position of the gap, from the second base station at least one of followings: a paging message, updated system broadcast information, and PWS information.

In an implementation mode, the first configuration information may include a TDM pattern configuration, the TDM pattern configuration being configured for determining a time domain position where the first base station does not work. The first time domain position refers to the time domain position where the first base station does not work.

The receiving unit 401 is configured to receive, at the time domain position where the first base station does not work, from the second base station at least one of followings: a paging message, updated system broadcast information, and PWS information.

In an implementation mode, the apparatus may also include a sending unit 402.

The sending unit 402 is configured to send a second request message to the first base station, the second request message being configured for requesting the first base station to configure a gap pattern or a TDM pattern.

In an implementation mode, the second request message may carry position information of a PO. The position information of the PO is determined based on the system broadcast information of the second base station.

In an implementation mode, the first configuration information may include a gap pattern configuration, the gap pattern configuration being configured for determining a time domain position of the gap. The first time domain position refers to the time domain position of the gap.

The apparatus may also include: a measuring unit 403, which is configured to perform, at the time domain position of the gap, cell selection measurement and/or cell re-selection measurement corresponding to the second communication card.

In an implementation mode, the first configuration information may include a TDM pattern configuration, the TDM pattern configuration being configured for determining a time domain position where the first base station does not work. The first time domain position refers to the time domain position where the first base station does not work.

The apparatus may also include: a measuring unit 403, which is configured to perform, at the time domain position where the first base station does not work, cell selection measurement and/or cell re-selection measurement corresponding to the second communication card.

In an implementation mode, the apparatus may also include: an obtaining unit 404, a generating unit 405, and a sending unit 402.

The obtaining unit 404 is configured to obtain frequency information of the cell selection measurement and/or the cell re-selection measurement based on system broadcast information of the second base station.

The generating unit 405 is configured to generate the gap pattern configuration or the TDM pattern configuration to be requested based on the frequency information of the cell selection measurement and/or the cell re-selection measurement.

The sending unit 402 is configured to send a third request message to the first base station, the third request message carrying the gap pattern configuration or the TDM pattern configuration to be requested and being configured for requesting the first base station to configure a gap pattern or a TDM pattern.

In an implementation mode, the frequency information may include at least one of followings corresponding to each of at least one frequency point: SMTC configuration information and SMTC timing information.

In an implementation mode, the apparatus may also include a determining unit and a sending unit 402.

The determining unit (not shown in the figure) is configured to determine, based on the service information that triggers the paging message, to reject the service reception at the second base station after receiving the paging message from the second base station.

The sending unit 402 is configured to send third indication information to the second base station, the third indication information being configured for indicating rejection of the service reception or indicating temporary rejection of the service reception.

In an implementation mode, the sending unit 402 is configured to send the third indication information to a core network corresponding to the second base station. When the third indication information indicates the temporary rejection of service reception, the third indication information further instructs the core network corresponding to the second base station to cache the service data locally, and to release the locally cached service data when a duration of caching the service data exceeds a specified duration.

In an implementation mode, the third indication information may carry a first timer configuration, the first timer configuration being configured for determining that a duration of a first timer is the specified duration. The core network corresponding to the second base station may start the first timer after receiving the third indication information that carries the first timer configuration, and releases the locally cached service data when the first timer times out.

In an implementation mode, the sending unit 402 is configured to send the third indication information to the second base station. When the third indication information indicates the temporary rejection of service reception, the third indication information further instructs the second base station to cache the service data locally, and to release the locally cached service data and/or release the second communication card to the inactive state when a duration of caching the service data exceeds a specified duration.

In an implementation mode, the third indication information may carry a second timer configuration, the second timer configuration being configured for determining that a duration of a second timer is the specified duration. The second base station starts the second timer after receiving the third indication information that carries the second timer configuration, and releases the locally cached service data when the second timer times out.

In an implementation mode, the apparatus may also include: a determining unit and a sending unit 402.

The determining unit is configured to determine, based on service information that triggers the paging message, to accept service reception at the second base station after receiving the paging message from the second base station.

The sending unit 402 is configured to send fourth indication information to the first base station, the fourth indication information being configured for indicating rejection of the service reception or indicating temporary rejection of the service reception.

In an implementation mode, the sending unit 402 is configured to send the fourth indication information to a core network corresponding to the first base station. When the fourth indication information indicates the temporary rejection of service reception, the fourth indication information further instructs the core network corresponding to the first base station to cache service data locally, and to release the locally cached service data when a duration of caching the service data exceeds a specified duration.

In an implementation mode, the fourth indication information may carry a third timer configuration, the third timer configuration being configured for determining that a duration of a third timer is the specified duration. The core network corresponding to the first base station starts the third timer after receiving the fourth indication information that carries the third timer configuration, and releases the locally cached service data when the third timer times out.

In an implementation mode, the sending unit 402 is configured to send the fourth indication information to the first base station. When the fourth indication information indicates the temporary rejection of service reception, the fourth indication information further instructs the first base station to cache the service data locally, and to release the locally cached service data and/or release the first communication card to the inactive state when a duration of caching the service data exceeds a specified duration.

In an implementation mode, the fourth indication information may carry a fourth timer configuration, the fourth timer configuration being configured for determining that a duration of a fourth timer is the specified duration. The first base station starts the fourth timer after receiving the fourth indication information that carries the fourth timer configuration, and releases the locally cached service data when the fourth timer times out.

In an implementation mode, the apparatus may also include: a determining unit and a receiving unit 401.

The determining unit is configured to determine, based on service information that triggers the paging message, to accept service reception at the second base station after receiving the paging message from the second base station.

The receiving unit 401 is configured to receive service data from the first base station and the service data from the second base station.

In an implementation mode, the apparatus may also include a negotiating unit.

The negotiating unit (not shown in the figure) is configured to negotiate again with the first base station and/or the second base station about a gap pattern configuration or a TDM pattern configuration.

In an implementation mode, the negotiating unit is configured to:

send a fourth request message to the first base station, the fourth request message carrying a gap pattern configuration or a TDM pattern configuration requested by the terminal device;

receive a target gap pattern configuration or a target TDM pattern configuration from the first base station, the target gap pattern configuration being the gap pattern configuration requested by the terminal device or a gap pattern configuration modified by the first base station, and the target TDM pattern configuration being the TDM pattern configuration requested by the terminal device or a TDM pattern configuration modified by the first base station; and send the target gap pattern configuration or the target TDM pattern configuration to the second base station.

In an implementation mode, the negotiating unit is configured to:

determine the gap pattern configuration or the TDM pattern configuration based on at least one of followings: a service type at the first base station, a service volume at the first base station, QoS at the first base station, a service type at the second base station, a service volume at the second base station, QoS at the second base station, and a timing deviation between the first base station and the second base station; and send the gap pattern configuration or the TDM pattern configuration to the first base station and/or the second base station.

In an implementation mode, the negotiation about the gap pattern configuration or the TDM pattern configuration may be triggered by the terminal device; or, the negotiation about the gap pattern configuration or the TDM pattern configuration may be triggered by the first base station; or, the negotiation about the gap pattern configuration or the TDM pattern configuration may be triggered by the second base station.

In an implementation mode, when cell re-selection or cell handover occurs to the second communication card, the negotiation about the gap pattern configuration or the TDM pattern configuration may be triggered by the terminal device; or, when cell handover occurs to the first communication card, the negotiation about the gap pattern configuration or the TDM pattern configuration may be triggered by the first base station or the terminal device.

In an implementation mode, the determining unit is further configured to: obtain the service information that triggers the paging message based on a paging cause in the paging message; or, after the second communication card enters the connected state, obtain the service information that triggers the paging message from the core network corresponding to the second base station.

In an implementation mode, the gap pattern configuration may include at least one of followings: a duration of the gap, a period of the gap, and a bias of the gap.

In an implementation mode, the TDM pattern configuration may include at least one of followings: a TDM pattern, a period of the TDM pattern, and a bias of the TDM pattern.

In an implementation mode, the apparatus may also include: a sending unit 402 and a releasing unit.

The sending unit 402 is configured to send a fifth request message to the first base station and/or the second base station when the terminal device determines that the gap pattern configuration or the TDM pattern configuration is not required, the fifth request message being configured for requesting release of the gap pattern configuration or the TDM pattern configuration.

The releasing unit (not shown in the figure) is configured to release the gap pattern configuration or the TDM pattern configuration after receiving the release acknowledgment message.

In an implementation mode, the base station corresponding to the first communication card and the base station corresponding to the second communication card may be different base stations; or the base station corresponding to the first communication card and the base station corresponding to the second communication card may be same base station.

It should be understood by those skilled in the art that the related descriptions about the signal transmission apparatus of the embodiments of the present disclosure may be understood with reference to the related descriptions about the signal transmission method of the embodiments of the present disclosure.

Figure 5:
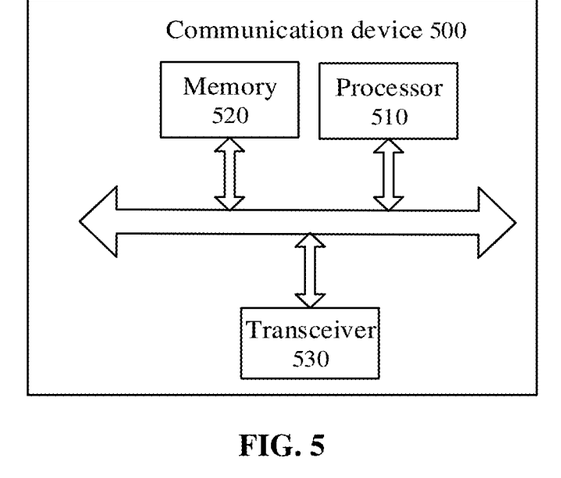
FIG. 5 is a schematic structure diagram of a communication device according to an embodiment of the present disclosure.

FIG. 5 is a schematic structure diagram of a communication device 500 provided by an embodiment of the present disclosure. The communication device may be a terminal device and may also be a network device. The communication device 500 shown in FIG. 5 includes a processor 510, and the processor 510 may call and run a computer program in a memory to implement the method in the embodiments of the present disclosure.

In some embodiments, as shown in FIG. 5, the communication device 500 may further include a memory 520. The processor 510 may call and run a computer program in the memory 520 to implement the method in the embodiments of the present disclosure.

The memory 520 may be a separate device independent of the processor 510, or may also be integrated in the processor 510.

In some embodiments, as shown in FIG. 5, the communication device 500 may further include a transceiver 530, and the processor 510 may control the transceiver 530 to communicate with another device, specifically sending information or data to another device or receiving information or data from another device.

The transceiver 530 may include a transmitter and a receiver. The transceiver 530 may further include an antenna. The number of the antenna may be one or more.

In some embodiments, the communication device 500 may specifically be the network device in the embodiments of the present disclosure, and the communication device 500 may implement corresponding flows implemented by the network device in each method of the embodiments of the present disclosure. For simplicity, elaborations are omitted herein.

In some embodiments, the communication device 500 may specifically be the mobile terminal/terminal device in the embodiments of the present disclosure, and the communication device 500 may implement corresponding flows implemented by the mobile terminal/terminal device in each method of the embodiments of the present disclosure. For simplicity, elaborations are omitted herein.

Figure 6:
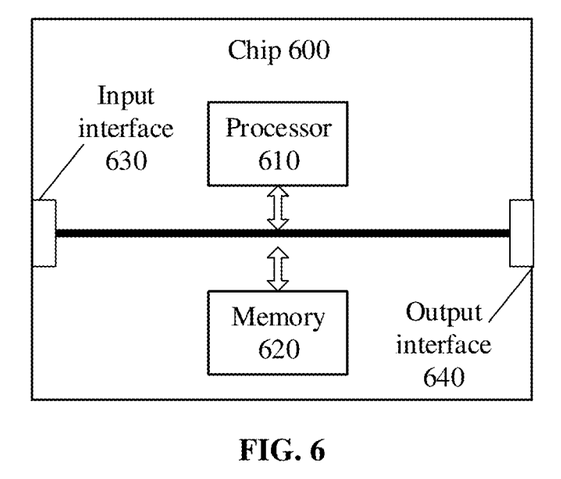
FIG. 6 is a schematic structure diagram of a chip according to an embodiment of the present disclosure.

FIG. 6 is a schematic structure diagram of a chip according to an embodiment of the present disclosure. The chip 600 shown in FIG. 6 includes a processor 610, and the processor 610 may call and run a computer program in a memory to implement the method in the embodiments of the present disclosure.

In some embodiments, as shown in FIG. 6, the chip 600 may further include a memory 620. The processor 610 may call and run a computer program in the memory 620 to implement the method in the embodiments of the present disclosure.

The memory 620 may be a separate device independent of the processor 610, or may also be integrated in the processor 610.

In some embodiments, the chip 600 may further include an input interface 630. The processor 610 may control the input interface 630 to communicate with other devices or chips; specifically, the input interface may acquire information or data from other devices or chips.

In some embodiments, the chip 600 may further include an output interface 640. The processor 610 may control the output interface 640 to communicate with other devices or chips; specifically, the output interface may output information or data to other devices or chips.

In some embodiments, the chip may be implemented by the network device of the embodiments of the present disclosure, and the chip may implement corresponding flows implemented by the network device in each method of the embodiments of the present disclosure. For simplicity, elaborations are omitted herein.

In some embodiments, the chip may be implemented by the mobile terminal/terminal device in the embodiment of the present disclosure, and the chip may implement corresponding flows implemented by the mobile terminal/terminal device in each method of the embodiments of the present disclosure. For simplicity, elaborations are omitted herein.

It is to be understood that the chip mentioned in the embodiment of the present disclosure may also be called a system-level chip, a system chip, a chip system or a system on chip, etc.

Figure 7:
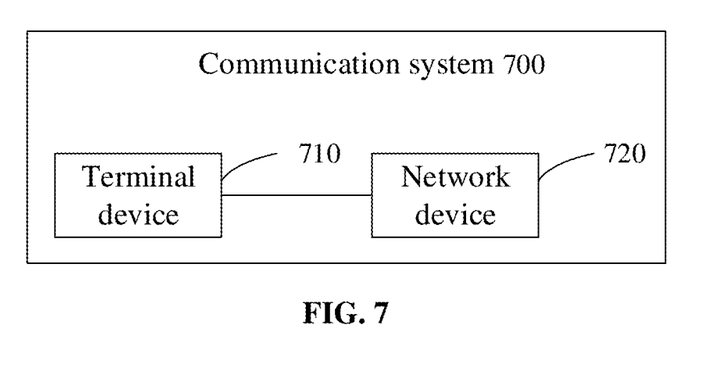
FIG. 7 is a schematic block diagram of a communication system provided by an embodiment of the present disclosure.

FIG. 7 is a schematic block diagram of a communication system 700 according to an embodiment of the present disclosure. As illustrated in FIG. 7, the communication system 700 includes the terminal device 710 and the network device 720.

The terminal device 710 may be configured to implement corresponding functions realizable by the terminal device in the method, and the network device 720 may be configured to implement corresponding functions realizable by the network device in the method. For simplicity, elaborations are omitted herein.

It is to be understood that the processor in the embodiment of the present disclosure may be an integrated circuit chip and has a signal processing capability. In an implementation process, each operation of the method embodiments may be completed by an integrated logical circuit of hardware in the processor or an instruction in a software form. The processor may be a universal processor, a digital signal processor (DSP), an application specific integrated circuit (ASIC), a field programmable gate array (FPGA) or another programmable logical device, discrete gate or transistor logical device and discrete hardware component. Each method, operation and logical block diagram described in the embodiments of the present disclosure may be implemented or executed. The universal processor may be a microprocessor, or the processor may also be any conventional processor and the like. The operations of the method disclosed in combination with the embodiments of the present disclosure may be directly embodied to be executed and completed by a hardware decoding processor or executed and completed by a combination of hardware and software modules in the decoding processor. The software module may be located in a mature storage medium in this field such as an RAM, a flash memory, an ROM, a PROM or EEPROM and a register. The storage medium is located in a memory, and the processor reads information in the memory, and completes the operations of the methods in combination with hardware.

It can be understood that the memory in the embodiment of the present disclosure may be a volatile memory or a nonvolatile memory, or may include both the volatile and nonvolatile memories. The nonvolatile memory may be a ROM, a PROM, an erasable PROM (EPROM), an EEPROM or a flash memory. The volatile memory may be a RAM, and is used as an external high-speed cache. It is exemplarily but unlimitedly described that RAMs in various forms may be adopted, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM) and a direct rambus RAM (DR RAM). It is to be noted that the memory of a system and method described in the present disclosure is intended to include, but not limited to, memories of these and any other proper types.

It is to be understood that the memories above mentioned are exemplarily but unlimitedly described; for example, the memories in the embodiments of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a Synchlink DRAM (SLDRAM) and a direct Rambus RAM (DR RAM). That is, the memories in the embodiments of the present disclosure are intended to include, but not limited to, memories of these and any other proper types.

The embodiments of the present disclosure also provide a computer-readable storage medium, which is configured to store a computer program.

In some embodiments, the computer-readable storage medium may be implemented by a network device in the embodiments of the present disclosure, and the computer program enables a computer to execute corresponding flows implemented by the network device in each method of the embodiments of the present disclosure. For simplicity, elaborations are omitted herein.

In some embodiments, the computer-readable storage medium may be implemented by a mobile terminal/terminal device in the embodiments of the present disclosure, and the computer program enables a computer to execute corresponding flows implemented by the mobile terminal/terminal device in each method of the embodiments of the present disclosure. For simplicity, elaborations are omitted herein.

The embodiments of the present disclosure also provide a computer program product, which includes a computer program instruction.

In some embodiments, the computer program product may be implemented by a network device in the embodiments of the present disclosure, and the computer program instruction enables a computer to execute corresponding flows implemented by the network device in each method of the embodiments of the present disclosure. For simplicity, elaborations are omitted herein.

In some embodiments, the computer program product may be implemented by a mobile terminal/terminal device in the embodiments of the present disclosure, and the computer program instruction enables the computer to execute corresponding flows implemented by the mobile terminal/terminal device in each method of the embodiments of the present disclosure. For simplicity, elaborations are omitted herein.

The embodiments of the present disclosure also provide a computer program.

In some embodiments, the computer program may be implemented by a network device in the embodiments of the present disclosure, and the computer program runs in a computer to enable the computer to execute corresponding flows implemented by the network device in each method of the embodiments of the present disclosure. For simplicity, elaborations are omitted herein.

In some embodiments, the computer program may be implemented by a mobile terminal/terminal device in the embodiments of the present disclosure, and the computer program runs in the computer to enable the computer to execute corresponding flows implemented by the mobile terminal/terminal device in each method of the embodiments of the present disclosure. For simplicity, elaborations are omitted herein.

Those of ordinary skill in the art may realize that the units and algorithm operations of each example described in combination with the embodiments disclosed in the present disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the present disclosure.

Those skilled in the art may clearly learn about that specific working processes of the system, device and unit described above may refer to the corresponding processes in the method embodiment and will not be elaborated herein for convenient and brief description.

In some embodiments provided by the present disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the present disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the present disclosure substantially or parts making contributions to the conventional art or part of the technical solutions may be embodied in form of software product, and the computer software product is stored in a storage medium, including multiple instructions configured to enable a computer device (which may be a personal computer, a server, a network device or the like) to execute all or part of the operations of the method in each embodiment of the present disclosure. The abovementioned storage medium includes: various media capable of storing program codes such as a U disk, a mobile hard disk, a ROM, a RAM, a magnetic disk or an optical disk.

The above is only the specific implementation manner of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

The invention claimed is:

1. A signal transmission method, comprising:
    receiving, by a terminal device, first configuration information from a first base station, the first configuration information being configured for determining a first time domain position, wherein the first base station is a base station corresponding to a first communication card in the terminal device, and the first communication card is in a connected state; and
    receiving, by the terminal device, a signal from a second base station at the first time domain position, wherein the second base station is a base station corresponding to a second communication card in the terminal device,
    wherein the first configuration information comprises a gap pattern configuration, the gap pattern configuration being configured for determining a time domain position of a gap, wherein the first time domain position is the time domain position of the gap,
    the method further comprises:
    performing, by the terminal device, at least one of cell selection measurement or cell re-selection measurement corresponding to the second communication card at the time domain position of the gap,
    wherein,
    when the terminal device determines that the gap pattern configuration is not required, sending, by the terminal device, a fifth request message to the first base station, the fifth request message being configured for requesting release of the gap pattern configuration; and
    after receiving a release acknowledgment message, releasing, by the terminal device, the gap pattern configuration.

2. The method of claim 1, wherein
    receiving, by the terminal device, the signal from the second base station at the first time domain position comprises:
        receiving, by the terminal device at the time domain position of the gap, from the second base station at least one of followings: a paging message, updated system broadcast information, and Public Warning System (PWS) information.

3. The method of claim 2, wherein before receiving, by the terminal device, the first configuration information from the first base station, the method further comprises:
    sending, by the terminal device, a second request message to the first base station, the second request message being configured for requesting the first base station to configure a gap pattern.

4. The method of claim 1, wherein before receiving, by the terminal device, the first configuration information from the first base station, the method further comprises:
    obtaining, by the terminal device, frequency information of at least one of the cell selection measurement or the cell re-selection measurement based on system broadcast information of the second base station;
    generating, by the terminal device, the gap pattern configuration to be requested based on the frequency information of at least one of the cell selection measurement or the cell re-selection measurement; and
    sending, by the terminal device, a third request message to the first base station, the third request message carrying the gap pattern configuration to be requested and being configured for requesting the first base station to configure a gap pattern.

5. The method of claim 4, wherein the frequency information comprises at least one of followings corresponding to each of at least one frequency point: SSB-based measurement timing configuration (SMTC) configuration information and SMTC timing information.

6. The method of claim 2, further comprising:
    after receiving the paging message from the second base station, determining, by the terminal device, to reject service reception at the second base station based on service information that triggers the paging message; and sending, by the terminal device, third indication information to the second base station, the third indication information being configured for indicating rejection of the service reception or indicating temporary rejection of the service reception.

7. The method of claim 2, further comprising:

after receiving the paging message from the second base station, determining, by the terminal device, to accept service reception at the second base station based on service information that triggers the paging message; and sending, by the terminal device, fourth indication information to the first base station, the fourth indication information being configured for indicating rejection of the service reception or indicating temporary rejection of the service reception.

8. The method of claim 7, wherein sending, by the terminal device, the fourth indication information to the first base station comprises:

sending, by the terminal device, the fourth indication information to a core network corresponding to the first base station, wherein when the fourth indication information indicates the temporary rejection of service reception, the fourth indication information further instructs the core network corresponding to the first base station to cache service data locally, and to release the locally cached service data when a duration of caching the service data exceeds a specified duration; or, sending, by the terminal device, the fourth indication information to the first base station, wherein when the fourth indication information indicates the temporary rejection of service reception, the fourth indication information further instructs the first base station to cache service data locally, and to release the locally cached service data and/or release the first communication card to an inactive state when a duration of caching the service data exceeds a specified duration.

9. The method of claim 2, further comprising:

after receiving the paging message from the second base station, determining, by the terminal device, to accept service reception at the second base station based on service information that triggers the paging message; and receiving, by the terminal device, service data from the first base station and service data from the second base station.

10. A signal transmission apparatus, implemented by a terminal device, comprising:

a processor; and a transceiver, connected to the processor and configured to:

receive first configuration information from a first base station, the first configuration information being configured for determining a first time domain position, wherein the first base station is a base station corresponding to a first communication card in the terminal device, and the first communication card is in a connected state; and receive a signal from a second base station at the first time domain position, wherein the second base station is a base station corresponding to a second communication card in the terminal device, wherein the first configuration information comprises a gap pattern configuration, the gap pattern configuration being configured for determining a time domain position of a gap, wherein the first time domain position is the time domain position of the gap, the processor is configured to perform at least one of cell selection measurement or cell re-selection measurement corresponding to the second communication card at the time domain position of the gap, wherein when the signal transmission apparatus determines that the gap pattern configuration is not required, the transceiver is configured to send a fifth request message to the first base station, the fifth request message being configured for requesting release of the gap pattern configuration; and after the transceiver receives a release acknowledgment message, the processor is configured to release the gap pattern configuration.

11. The apparatus of claim 10, wherein the transceiver is configured to receive, at the time domain position of the gap, from the second base station at least one of followings: a paging message, updated system broadcast information, and Public Warning System (PWS) information.

12. The apparatus of claim 11, wherein the transceiver is further configured to:

send a second request message to the first base station, the second request message being configured for requesting the first base station to configure a gap pattern.

13. The apparatus of claim 10, wherein the processor is further configured to:

obtain frequency information of at least one of the cell selection measurement or the cell re-selection measurement based on system broadcast information of the second base station;

generate the gap pattern configuration to be requested based on the frequency information of at least one of the cell selection measurement or the cell re-selection measurement; and control the transceiver to send a third request message to the first base station, the third request message carrying the gap pattern configuration to be requested and being configured for requesting the first base station to configure a gap pattern.

14. The apparatus of claim 13, wherein the frequency information comprises at least one of followings corresponding to each of at least one frequency point: SSB-based measurement timing configuration (SMTC) configuration information and SMTC timing information.

15. The apparatus of claim 11, wherein the processor is configured to determine, based on service information that triggers the paging message, to reject service reception at the second base station after the paging message is received from the second base station; and the transceiver is further configured to send third indication information to the second base station, the third indication information being configured for indicating rejection of the service reception or indicating temporary rejection of the service reception.

16. The apparatus of claim 11, wherein the processor is configured to determine, based on service information that triggers the paging message, to accept service reception at the second base station after the paging message is received from the second base station; and the transceiver is configured to send fourth indication information to the first base station, the fourth indication information being configured for indicating rejection of the service reception or indicating temporary rejection of the service reception.

17. A chip, comprising: a processor, configured to call a computer program from a memory and run the computer program to cause a device provided with the chip to implement a method of claim 1.

18. A non-transitory computer-readable storage medium, configured to store a computer program enabling a computer implemented by terminal device to execute a method comprising:

receiving first configuration information from a first base station, the first configuration information being configured for determining a first time domain position, wherein the first base station is a base station corresponding to a first communication card in the terminal device, and the first communication card is in a connected state; and     receiving a signal from a second base station at the first time domain position, wherein the second base station is a base station corresponding to a second communication card in the terminal device, wherein the first configuration information comprises a gap pattern configuration, the gap pattern configuration being configured for determining a time domain position of a gap, wherein the first time domain position is the time domain position of the gap, the method further comprises:

performing, by the terminal device, at least one of cell selection measurement or cell re-selection measurement corresponding to the second communication card at the time domain position of the gap, wherein, when the terminal device determines that the gap pattern configuration is not required, sending, by the terminal device, a fifth request message to the first base station, the fifth request message being configured for requesting release of the gap pattern configuration; and after receiving a release acknowledgment message, releasing, by the terminal device, the gap pattern configuration.

\* \* \* \* \*